United States Patent
Nies et al.

(10) Patent No.: US 7,617,228 B2
(45) Date of Patent: Nov. 10, 2009

(54) DISPLAYING IMAGE DATA

(75) Inventors: Ian A. Nies, San Francisco, CA (US);
Michael John Russo, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 511 days.

(21) Appl. No.: 10/883,380

(22) Filed: Jul. 1, 2004

(65) Prior Publication Data
US 2005/0022121 A1   Jan. 27, 2005

Related U.S. Application Data

(60) Provisional application No. 60/489,308, filed on Jul. 22, 2003.

(51) Int. Cl.
*G06F 17/00* (2006.01)
(52) U.S. Cl. .................. 707/101; 707/100; 707/102; 707/104.1; 715/700; 345/473
(58) Field of Classification Search ............. 707/100, 707/101, 102, 104.1; 715/723
See application file for complete search history.

(56) References Cited

U.S. PATENT DOCUMENTS

| | | | | |
|---|---|---|---|---|
| 5,764,241 A | * | 6/1998 | Elliott et al. | 345/473 |
| 6,078,739 A | * | 6/2000 | Paterson et al. | 703/6 |
| 6,492,998 B1 | * | 12/2002 | Kim et al. | 715/723 |
| 6,602,297 B1 | * | 8/2003 | Song | 715/500.1 |

FOREIGN PATENT DOCUMENTS

GB   2353613 A   2/2001

* cited by examiner

*Primary Examiner*—Hung Q Pham
(74) *Attorney, Agent, or Firm*—Patterson & Sheridan, LLP

(57) ABSTRACT

A machine-readable definition of a three-dimensional scene is represented. A list of relationships between elements of the scene is generated, wherein each entry on said list identifies two elements and the nature of a relationship between the two elements. A displayable schematic representation of the scene is created in which elements of the scene are defined by nodes and relationships between the nodes are represented by links. Input data is received in response to displaying the list of relationships that identifies one of the relationships. A portion of the schematic representation is displayed showing the elements related by the relationship identified by the input data.

27 Claims, 25 Drawing Sheets

| | RELATIONSHIP | SOURCE NODE | END NODE |
|---|---|---|---|
| 804 | OBJECT INSTANCE | BALL 1 | BALL 2 |
| 805 | OBJECT INSTANCE | BALL 1 | BALL 3 |
| 806 | CONSTRAINT | BALL 1 | EYES |
| 807 | PARAMETER WIRING | BALL 1 | BALL 2 |
| 808 | MODIFIER | BARK | MOUTH |
| 809 | CONTROLLER | BALL 1 | BALL 3 |

*Figure 8*

| RELATIONSHIP | SOURCE NODE | END NODE |
| --- | --- | --- |
| OBJECT INSTANCE | BALL 1 | BALL 2 |
| OBJECT INSTANCE | BALL 1 | BALL 3 |

*Figure 16*

| RELATIONSHIP | SOURCE NODE | END NODE |
|---|---|---|
| CONSTRAINT | BALL 1 | EYES |

*Figure 17*

| RELATIONSHIP | SOURCE NODE | END NODE |
|---|---|---|
| CONTROLLER | BALL 1 | BALL 3 |

*Figure 18*

| RELATIONSHIP | SOURCE NODE | END NODE |
|---|---|---|
| MODIFIER | BARK | MOUTH |

*Figure 19*

| RELATIONSHIP | SOURCE NODE | END NODE |
|---|---|---|
| PARAMETER WIRING | BALL 1 | BALL 2 |

*Figure 20*

DISPLAYING IMAGE DATA

CROSS-REFERENCE TO RELATED APPLICATIONS

This application claims benefit of U.S. provisional patent application Ser. No. 60/489,308, filed Jul. 22, 2003, which is herein incorporated by reference.

BACKGROUND OF THE INVENTION

1. Field of the Invention

Embodiments of the present invention generally relate to representing a schematic of a scene including three dimensional objects and the relationships between the objects.

2. Description of the Related Art

The present invention relates to representing a machine-readable definition of a three-dimensional image.

A problem associated with representing three-dimensional data is that a user often encounters difficulties in terms of identifying data of interest. This problem becomes more acute as data sets become larger.

SUMMARY OF THE INVENTION

The present invention generally facilitates the representation and display of three dimensional object data and relationships between object elements. A list of relationships between elements of the scene is generated, wherein each entry on said list identifies two elements and the nature of a relationship between the two elements. A displayable schematic representation of the scene is created in which elements of the scene are defined by nodes and relationships between the nodes are represented by links. Input data is received in response to displaying the list of relationships that identifies one of the relationships. A portion of the schematic representation is displayed showing the elements related by the relationship identified by the input data.

Various embodiments of the invention include a computer readable medium storing instructions for causing a computer to display a portion of a schematic representation of a scene, by performing the steps of generating a list of relationships, each entry in the list of relationships identifying two elements and a link defining a relationship type between the two elements, receiving selection data input specifying one relationship type of a plurality of relationship types, and displaying the portion of the schematic representation of the scene including any nodes and any links in the list of relationships related by the one relationship type specified by the selection data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8 shows a list of relationships, according to one embodiment of the present invention;

FIG. 16 shows a first partial relationship types list, according to one embodiment of the present invention;

FIG. 17 shows a second partial relationship types list, according to one embodiment of the present invention;

FIG. 18 shows a third partial relationship types list, according to one embodiment of the present invention;

FIG. 19 shows a fourth partial relationship types list, according to one embodiment of the present invention;

FIG. 20 shows a fifth partial relationship types list, according to one embodiment of the present invention;

DETAILED DESCRIPTION

Figure 1:
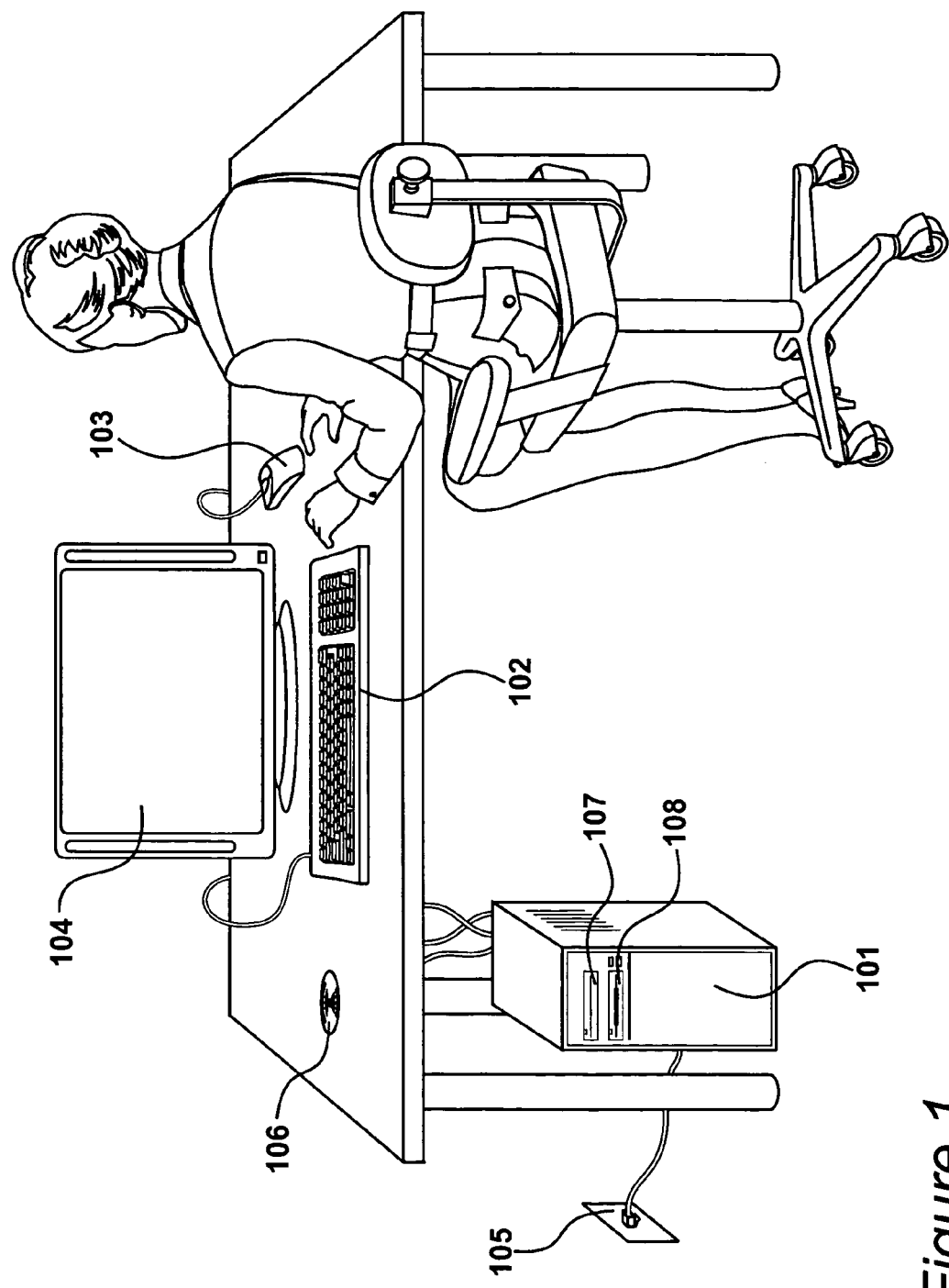
FIG. 1 shows an environment for representing a machine-readable definition of a three-dimensional object, according to one embodiment of the present invention.

FIG. 1 shows an environment for representing a machine-readable definition of a three-dimensional object, according to one embodiment of the present invention. Data processing is effected by a programmable computer system 101 that responds to input data from a user via a keyboard 102 and a mouse 103. Alternatively, other input devices may be used such as a stylus and tablet or a tracker-ball. Output data from computer system 101 is displayed to the user via a visual display unit 104. A network connection 105 allows computer system 101 to communicate with a local server and also facilitates communication externally via the internet.

Computer system 101 receives input data from the keyboard 102 and other input devices via cable connections although in alternative embodiments radio interfaces could be provided. Many different types of programmable computer system 101 could be deployed and in alternative embodiments of the present invention the functionality could be provided using dedicated hardware.

Instructions executable by computer system 101 are received by an instruction carrying medium such as a CD-ROM 106 or a similar instruction carrying medium such as a DVD etc. The computer system 101 may also have devices for recording output data, such as CD-ROM burners or DVD burner 107 or removable magnetic disk storage device 108, for example.

Figure 2:
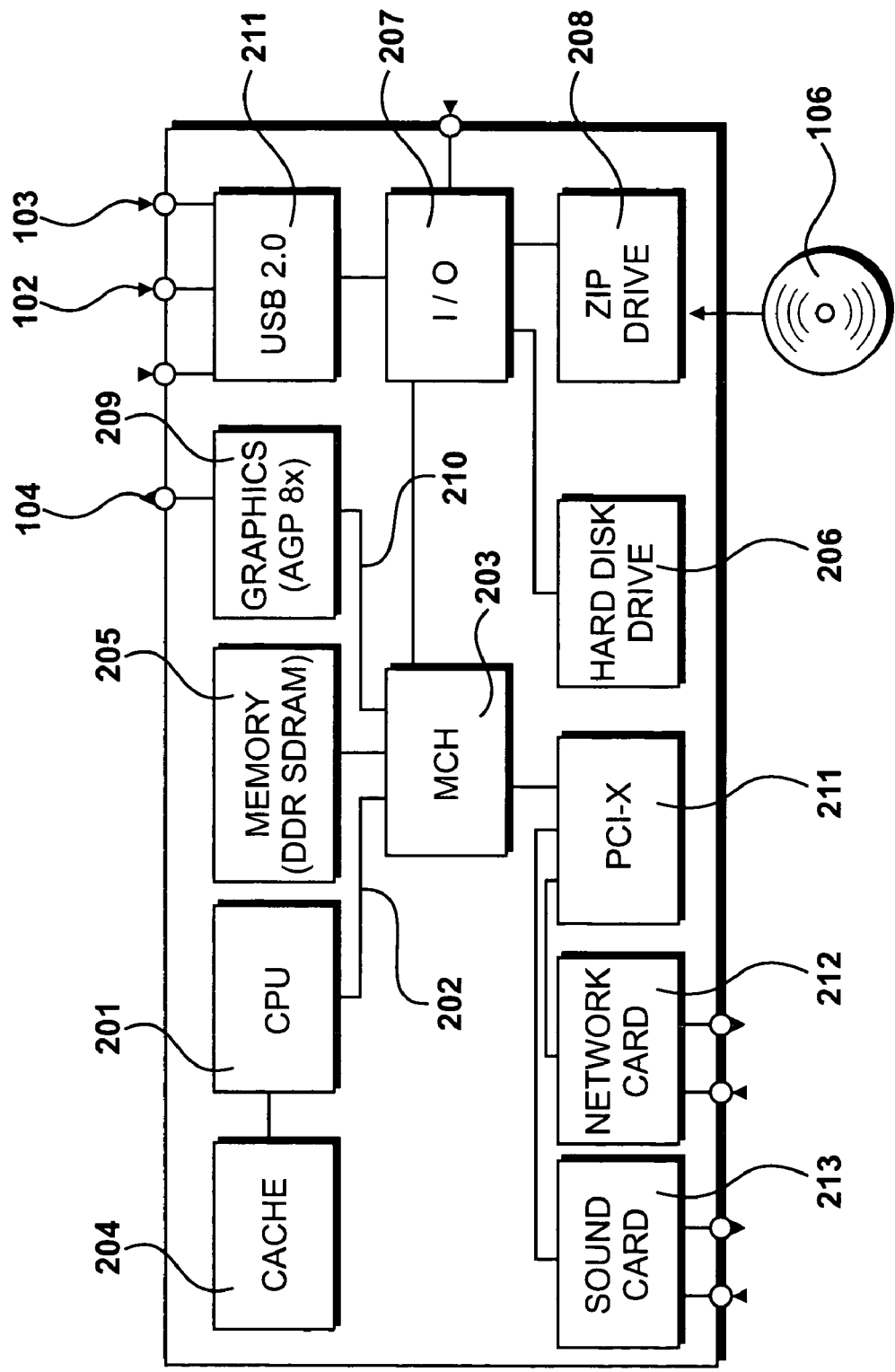
FIG. 2 shows the components of computer system shown in FIG. 1.

FIG. 2 shows the components of computer system 101, according to one embodiment of the present invention. In some embodiments of the present invention, the components are based upon Intel® E7505 hub-based Chipset.

The system includes an Intel® Pentium™ Xeon™ DP central processing unit (CPU) 201 running at three Gigahertz (3 GHz), which fetches instructions for execution and manipulates data via an Intel® E7505 533 Megahertz system bus 202 providing connectivity with a Memory Controller Hub (MCH) 203. The CPU 201 has a secondary cache 204 comprising five hundred and twelve kilobytes of high speed static RAM, for storing frequently-accessed instructions and data to reduce fetching operations from a larger main memory 205 via the memory controller hub 203. The memory controller hub 203 thus co-ordinates data and instruction flow with the main memory 205, which is one gigabyte in storage capacity. Instructions and data are thus stored in the main memory 205 and the cache 204 for swift access by the CPU 201.

A hard disk drive 206 provides non-volatile bulk storage of instructions and data via an Input/Output Controller Hub (ICH) 207. The I/O controller hub 207 similarly provides connectivity to DVD-ROM re-writer 208 which reads the CDROM 106 shown in FIG. 1. Connectivity is also provided to USB 2.0 interface 211, to which the keyboard 102 and mouse 103 are attached, all of which send user input data to the processing system 101.

A graphics card 209 receives graphic data and instructions from the CPU 201. The graphics card 209 is connected to the memory controller hub 203 by means of a high speed AGP graphics bus 210. A PCI interface 211 provides connections to a network card 212 that provides access to the network 106, over which instructions and or data may be transferred. A sound card 213 is also connected to the PCI interface 211 and receives sound data or instructions from the CPU 201.

The equipment shown in FIG. 2 constitutes the components of a high-end IBM™ PC compatible processing system. In an alternative embodiment of the present invention, similar functionality is achieved using an Apple™ PowerPC™ architecture-based processing system.

Figure 3:
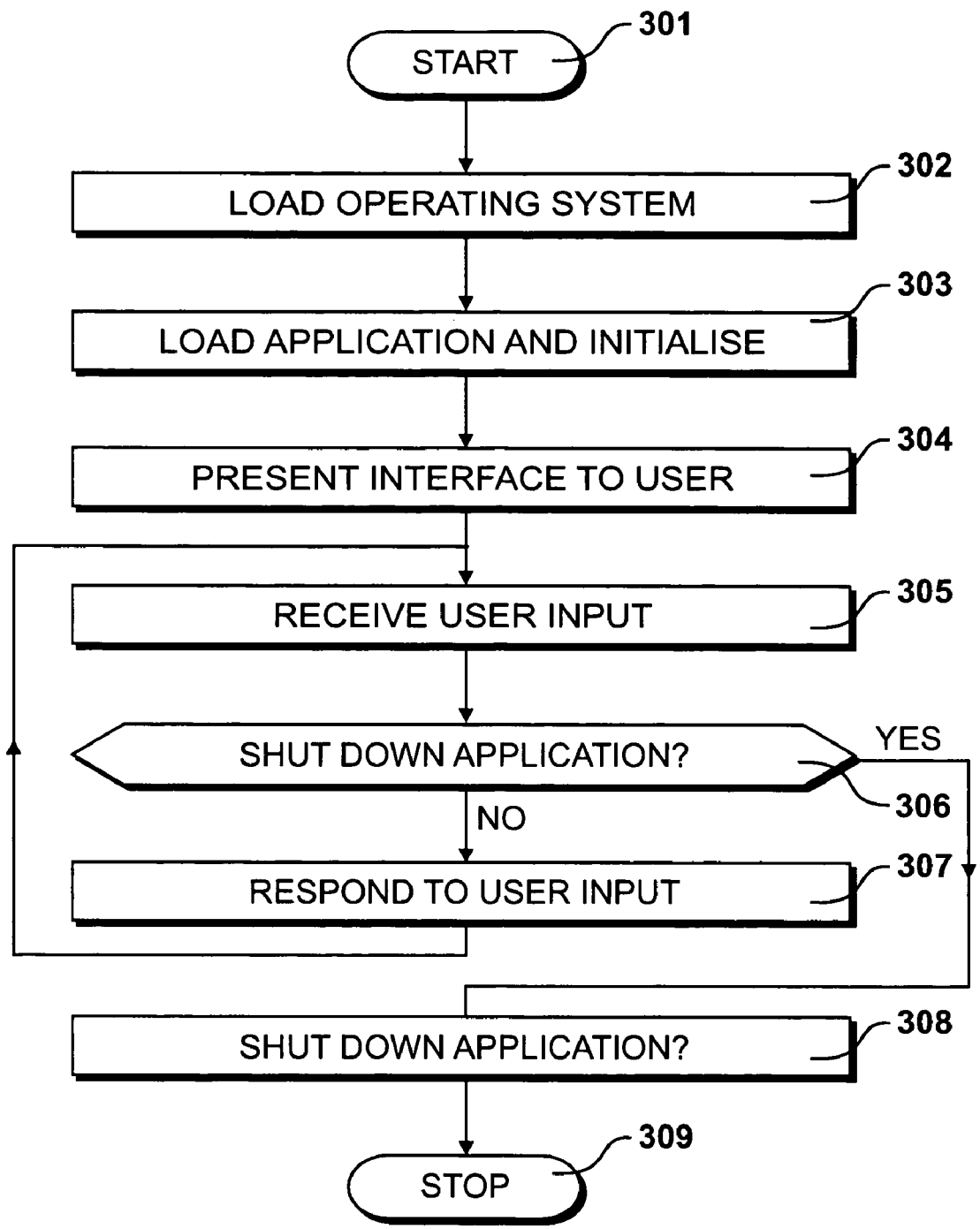
FIG. 3 shows operations performed by the system illustrated in FIG. 2, according to one embodiment of the present invention.

FIG. 3 shows operations performed by the system illustrated in FIG. 2 according to one embodiment of the present invention. After starting operation at step 301, instructions defining an operating system are loaded at step 302. In some embodiments of the present invention, the operating system is Microsoft™ Windows™ but in alternative embodiments of the present invention, other operating systems may be used such as MacX™, Unix™ or Linux, for example.

At step 303 instructions for the application are loaded and initialised resulting in a user interface being displayed at step 304. At step 305 a user input command is received either in response to operation of a keyboard 102 or in response to operation of mouse 103.

At step 306 a question is asked as to whether a shutdown command has been received and if this question is answered in the affirmative the application is shut down at step 308 and the procedure is stopped 309. Alternatively, if the question asked at step 306 is answered in the negative, the application responds to the user input (received at step 305) at step 307. Thereafter, further input commands are received at step 305 and further responses are made at step 307 until a shutdown command is received and the question asked at step 306 is answered in the affirmative.

Figure 4:
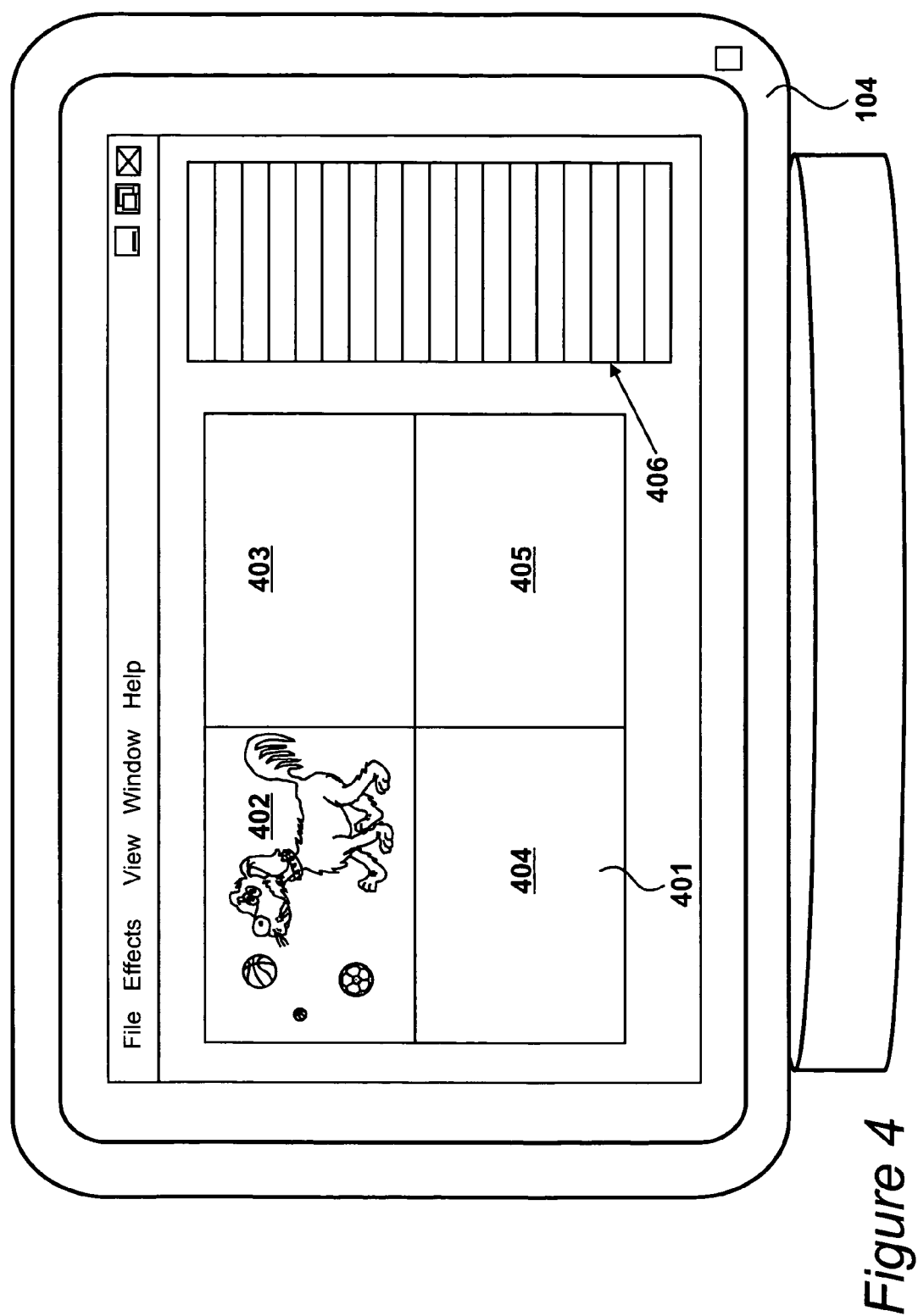
FIG. 4 shows a user interface generated after application loading, according to one embodiment of the present invention.

FIG. 4 shows a user interface, according to one embodiment of the present invention. The user interface is generated at step 304 as previously described, and is displayed to a user via visual display unit 104. A main display window 401 is divided into four tiles 402, 403, 404 and 405. Tile 402 displays a three-dimensional representation of an object or objects and orthogonal projections may be displayed in tiles 403 to 405. In addition, a window 406 displays a menu of functions that may be selected by cursor positioning in response to operation of mouse 103. Many functions are available within the system including functions for the generation and manipulation of schematic views as described with reference to the present embodiments.

Figure 5:
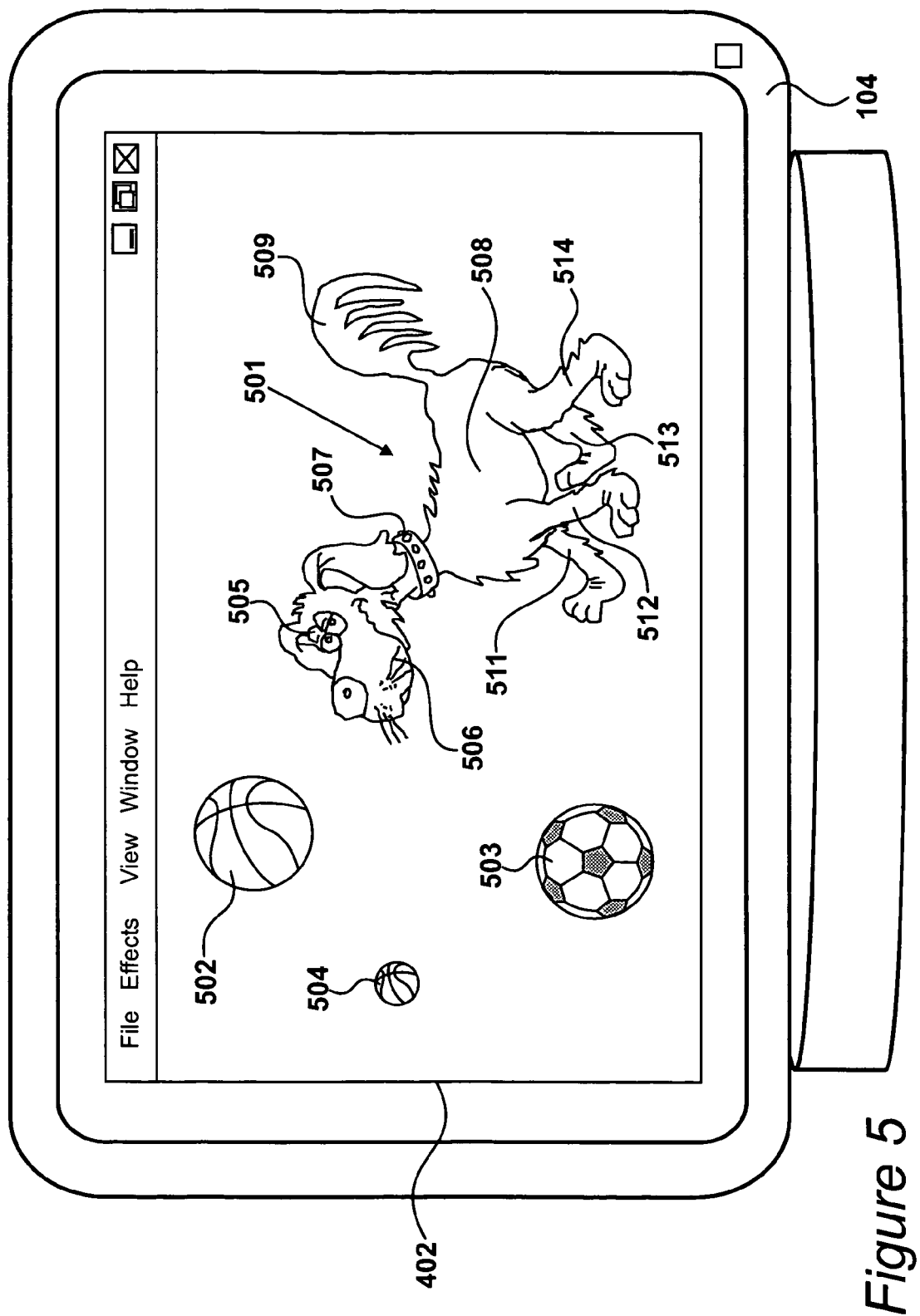
FIG. 5 shows a detail of part of the user interface shown in FIG. 4, according to one embodiment of the present invention.

FIG. 5 shows tile 402 and a three-dimensional scene that is currently being manipulated by a user, according to one embodiment of the present invention. In this example, described for the benefit of illustration only, the scene consists of an animatable dog 501 along with a first animatable ball 502, a second animatable ball 503 and a third animatable ball 504. Individual components of dog 501 may be animated independently. Thus, the dog's eyes 505 may be animated along with the dog's head 506 with respect to the dog's neck 507. Neck 507 may be animated with respect to the dog's body 508 and the dog's tail 509 may also be animated with respect to the dog's body 508. A first. leg 511 may be animated with respect to the dog's body 508, a second leg 512 may be animated with respect to the dog's body, a third leg 513 may be animated with respect to the dog's body, and a fourth leg 514 may be animated with respect to the dog's body 508. Furthermore, each of said legs 511 to 514 consists of an upper portion, a lower portion and a foot.

Figure 6:
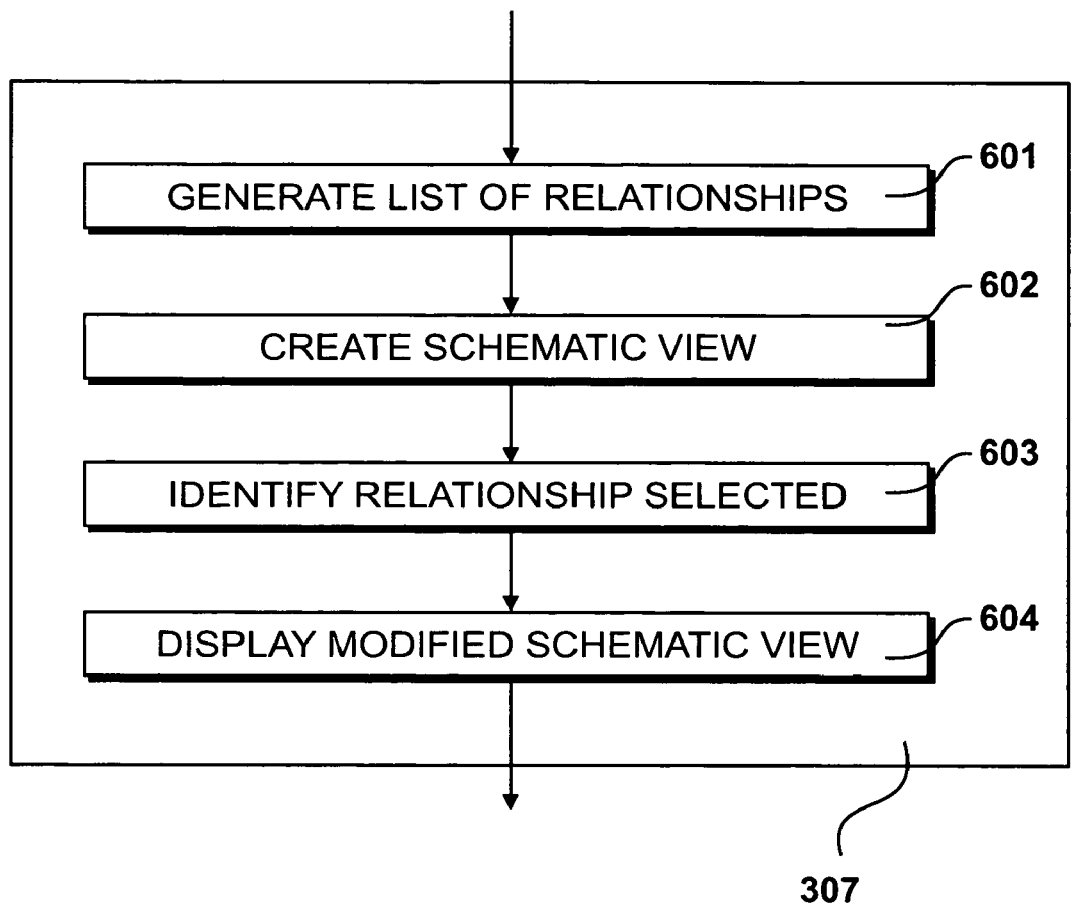
FIG. 6 shows a flow chart of steps involved in a preferred embodiment of the invention, according to one embodiment of the present invention.

FIG. 6 shows procedures performed at step 307, according to one embodiment of the present invention. At step 601 a list of relationships between elements of a machine-readable representation of a three-dimensional image are displayed. Step 602 includes the creation of a displayable schematic representation of an image in which elements of the image are defined by nodes and relationships between said nodes are represented by links. At step 603, a relationship is identified in response to user input, and at step 604 a modified schematic view is displayed, showing the nodes related by the relationship identified the user selection data.

Figure 7:
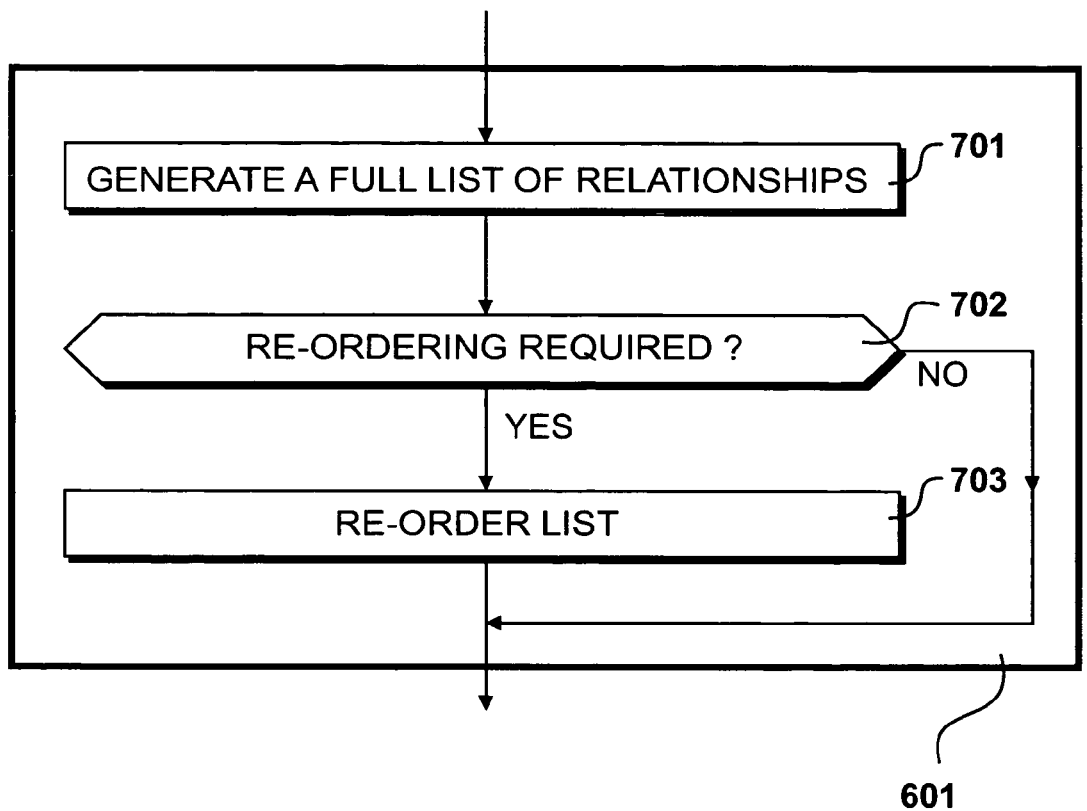
FIG. 7 shows an expansion of part of FIG. 6, according to one embodiment of the present invention.

Step 601 which relates to generation of a list of relationships, is shown in expanded form in FIG. 7, according to one embodiment of the present invention. At step 701 a full list of relationships for the visual scene is generated. This is shown in FIG. 8. A question is asked at step 702 as to whether re-ordering of the list is required. If the question at step 702 is answered in the affirmative, the list is re-ordered at step 703. If the question at step 702 is answered in the negative, then no further action is taken in step 601.

As previously stated, a full list of relationships is generated at step 701. FIG. 8 describes step 701, according to one embodiment of the present invention. Information provided takes the form of relationship name in column 801, source node in column 802 and end node in column 803. Relationships 804 and 805 relate to the fact that the end nodes are instances of the source nodes. A constraint upon the end node is illustrated by relationship 806, whilst parameter wiring is shown at relationship 807. Relationship 808 is a modifier and relationship 809 a controller.

Figure 9:
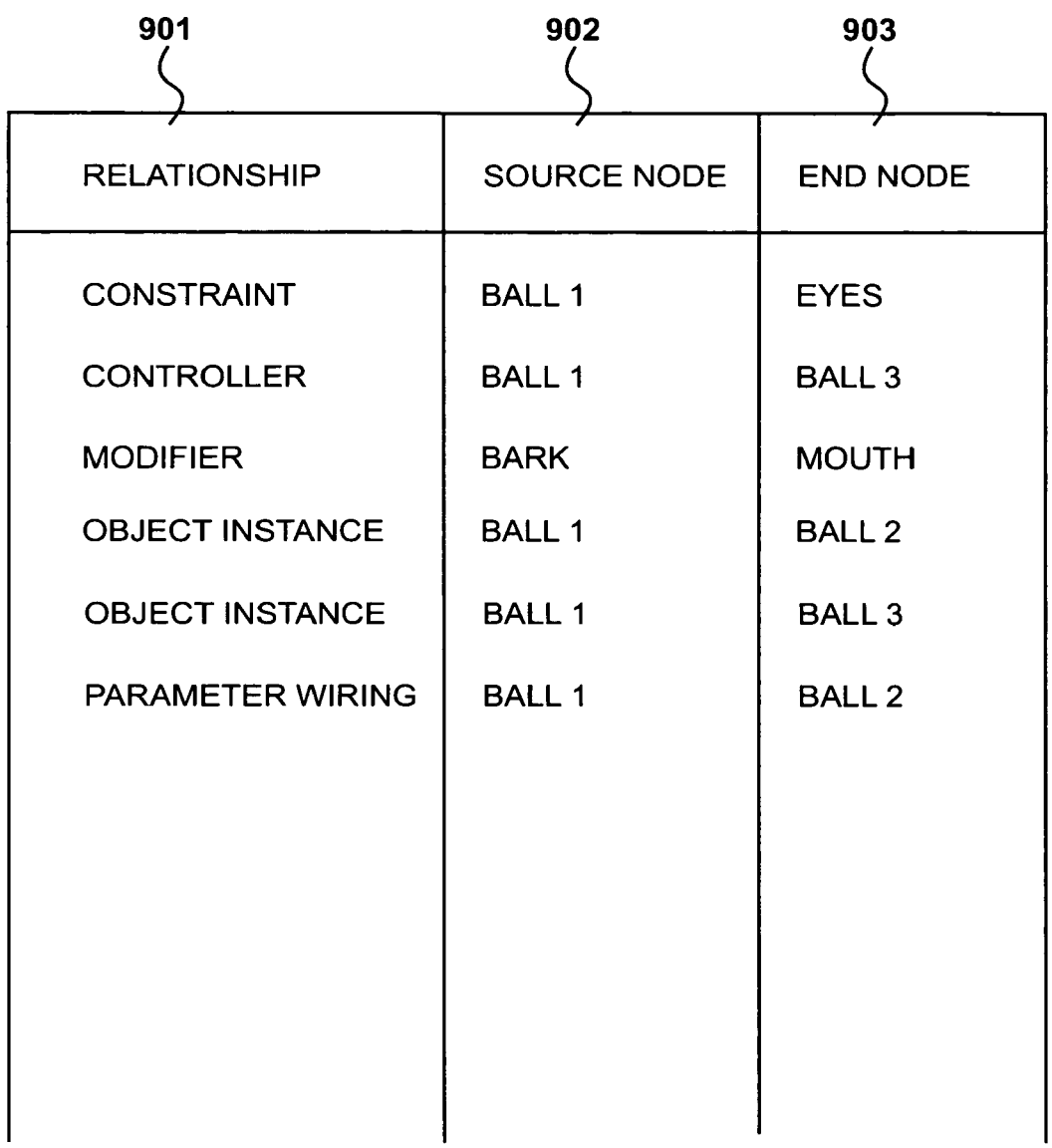
FIG. 9 shows a first re-ordered version of FIG. 8, according to one embodiment of the present invention.

FIG. 9 shows a re-ordered version of the list of relationships shown in FIG. 8, according to one embodiment of the present invention. Here the relationships have been placed in alphabetical order according to the relationship name column 901 but a different ordering system could be specified by the user. The source node in each relationship is named in column 902 and the end node in column 903.

Figure 10:
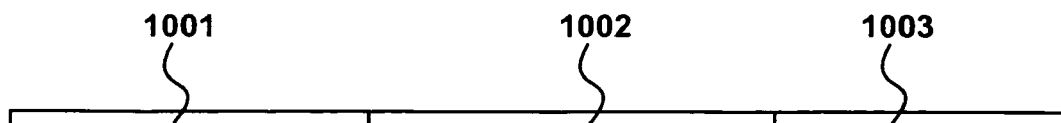
FIG. 10 shows a second re-ordered version of FIG. 8, according to one embodiment of the present invention.

FIG. 10 shows the same information as FIG. 9, but here sorted according to the source node, in column 1001, according to one embodiment of the present invention. The flexibility of the sorting assists selection of relationships. Relationship type information is displayed in column 1002 and end nodes are named in column 1003.

Figure 11:
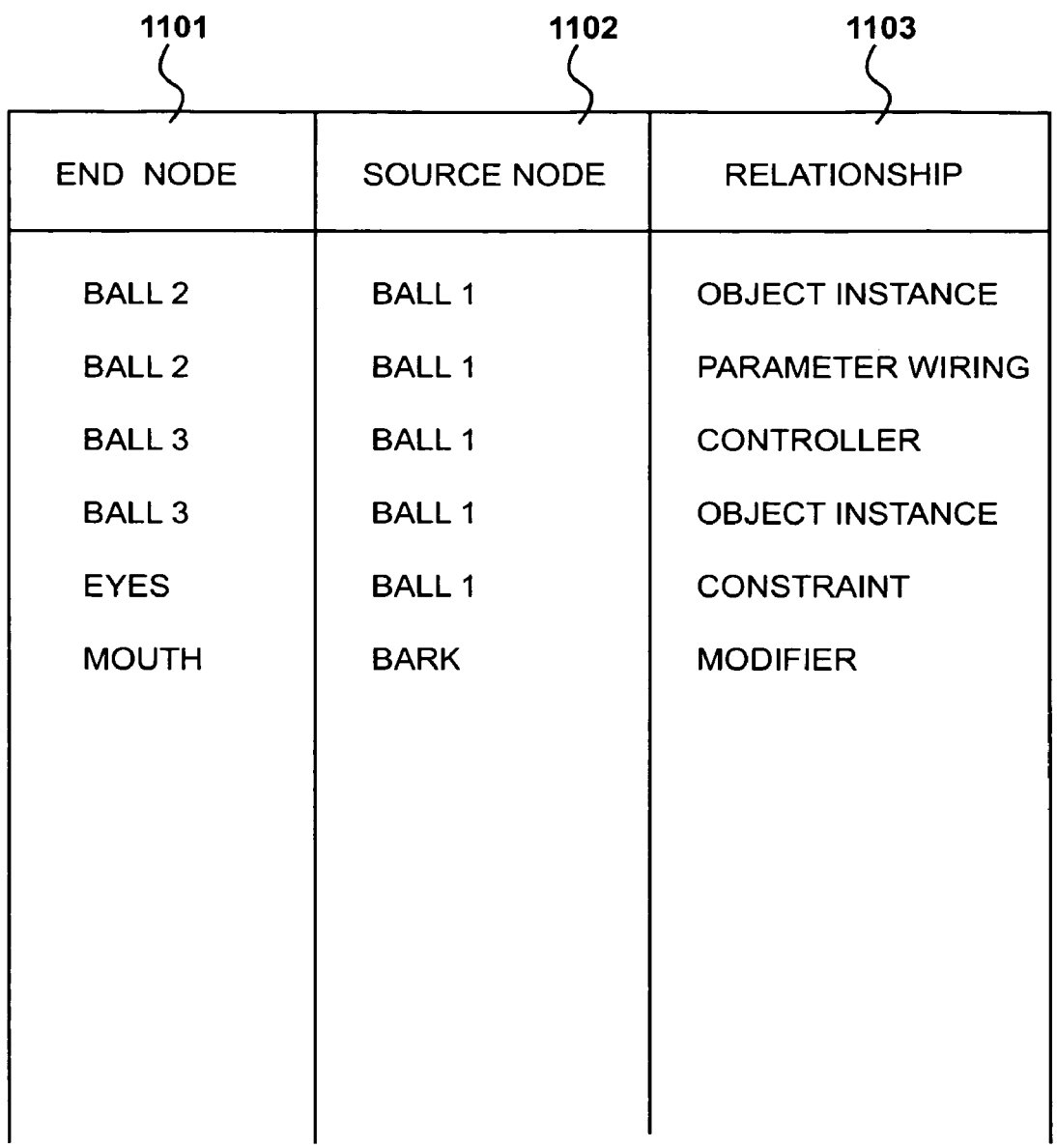
FIG. 11 shows a third re-ordered version of FIG. 8, according to one embodiment of the present invention.

FIG. 11 shows the same information as FIG. 9, but here sorted according to the end node, in column 1101, according to one embodiment of the present invention. Source nodes are named in column 1102 and relationship type information is displayed in column 1103.

Figure 12:
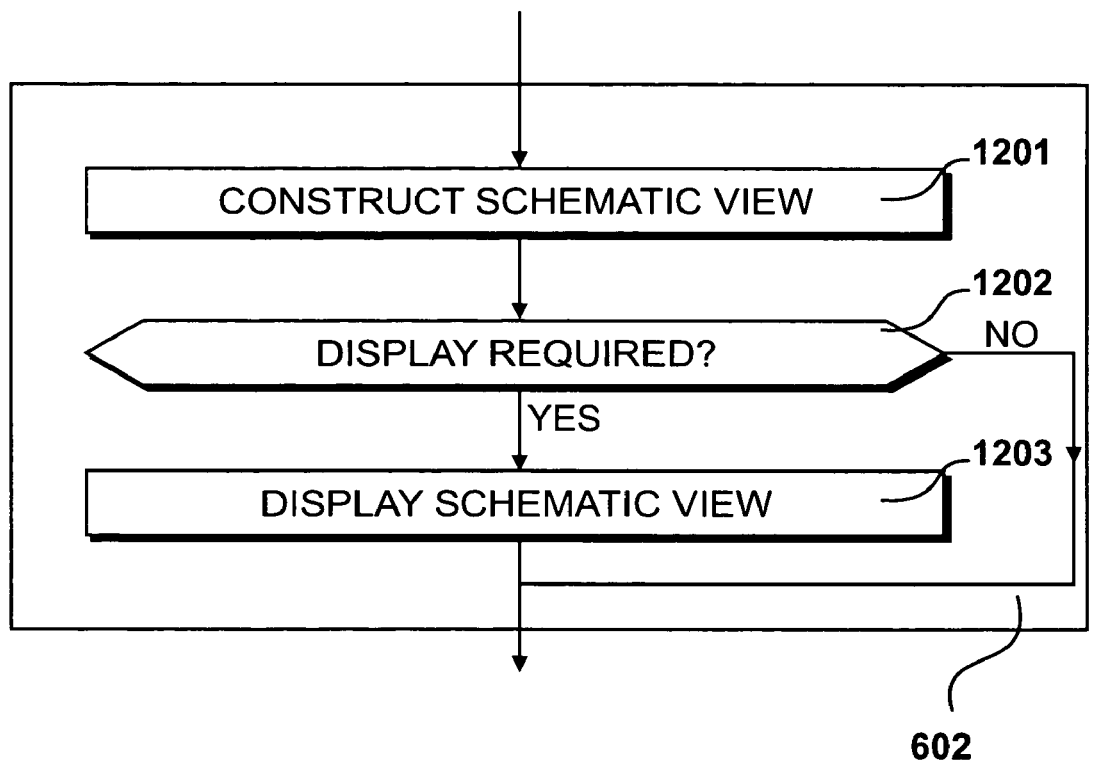
FIG. 12 shows an expanded version of part of FIG. 6, according to one embodiment of the present invention.
Figure 13:
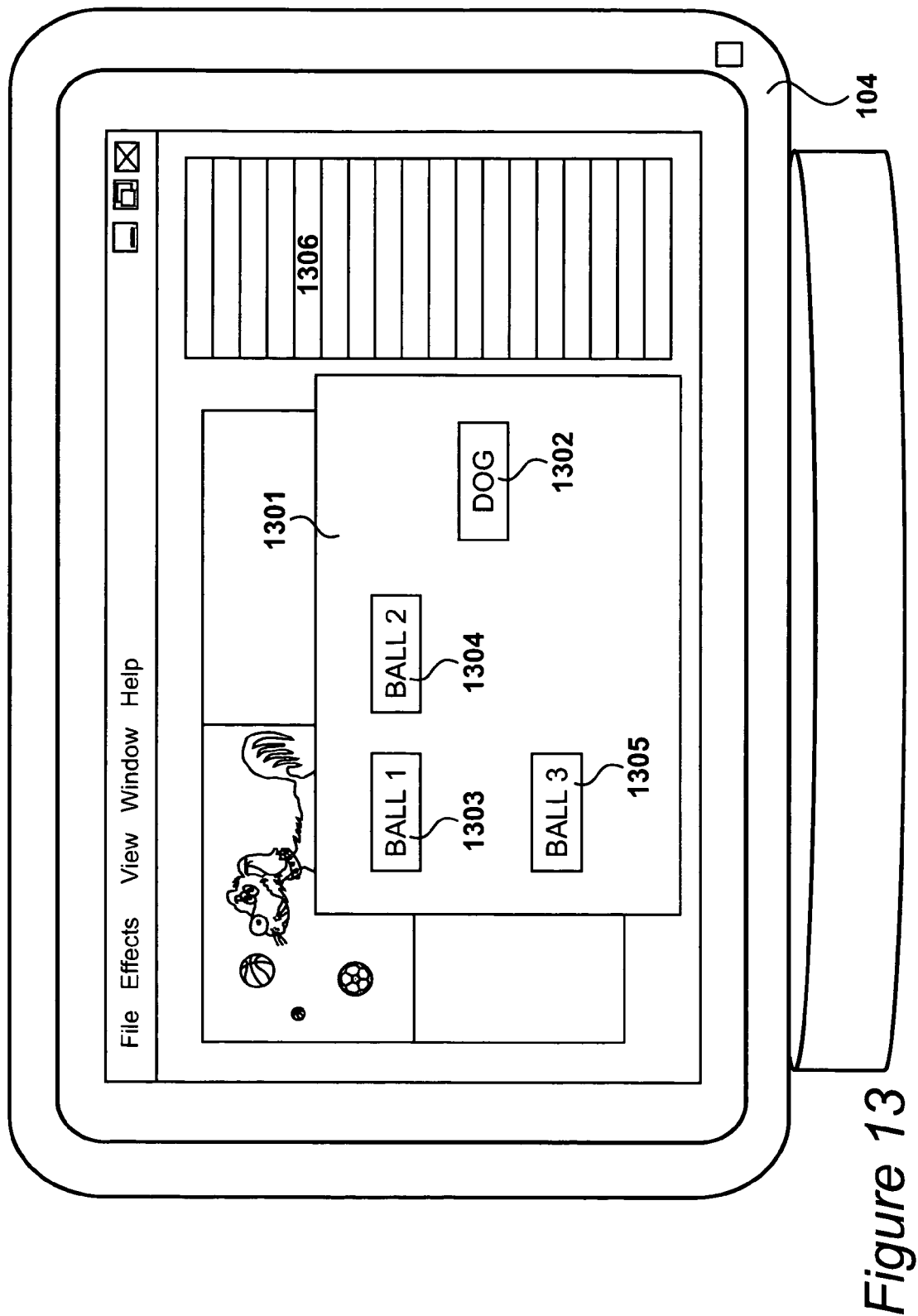
FIG. 13 shows an example of a schematic view, according to one embodiment of the present invention.

FIG. 12 shows step 602 which relates to creation of a schematic view is shown in expanded form, according to one embodiment of the present invention. At step 1201 a schematic view is created, and a question is asked at step 1202 as to whether or not the schematic view should be displayed. If the question at step 1202 is answered in the affirmative, then the schematic view is displayed at step 1203, as shown in FIG. 13, according to one embodiment of the present invention. If the question asked at step 1202 is answered in the negative, then no further action is taken within step 602.

As previously stated, step 1202 effects the display of a schematic view as shown in FIG. 13. The schematic view is presented on visual display unit 104 in the form of a floating window 1301. Each of the objects within the view is represented by a respective node. Such that the dog object 501 is represented by a dog node 1302, ball object 502 is represented by ball 1 node 1303, ball object 503 is represented by a ball 2 node 1304 and ball object 504 is represented by a ball 3 node 1305.

Figure 14:
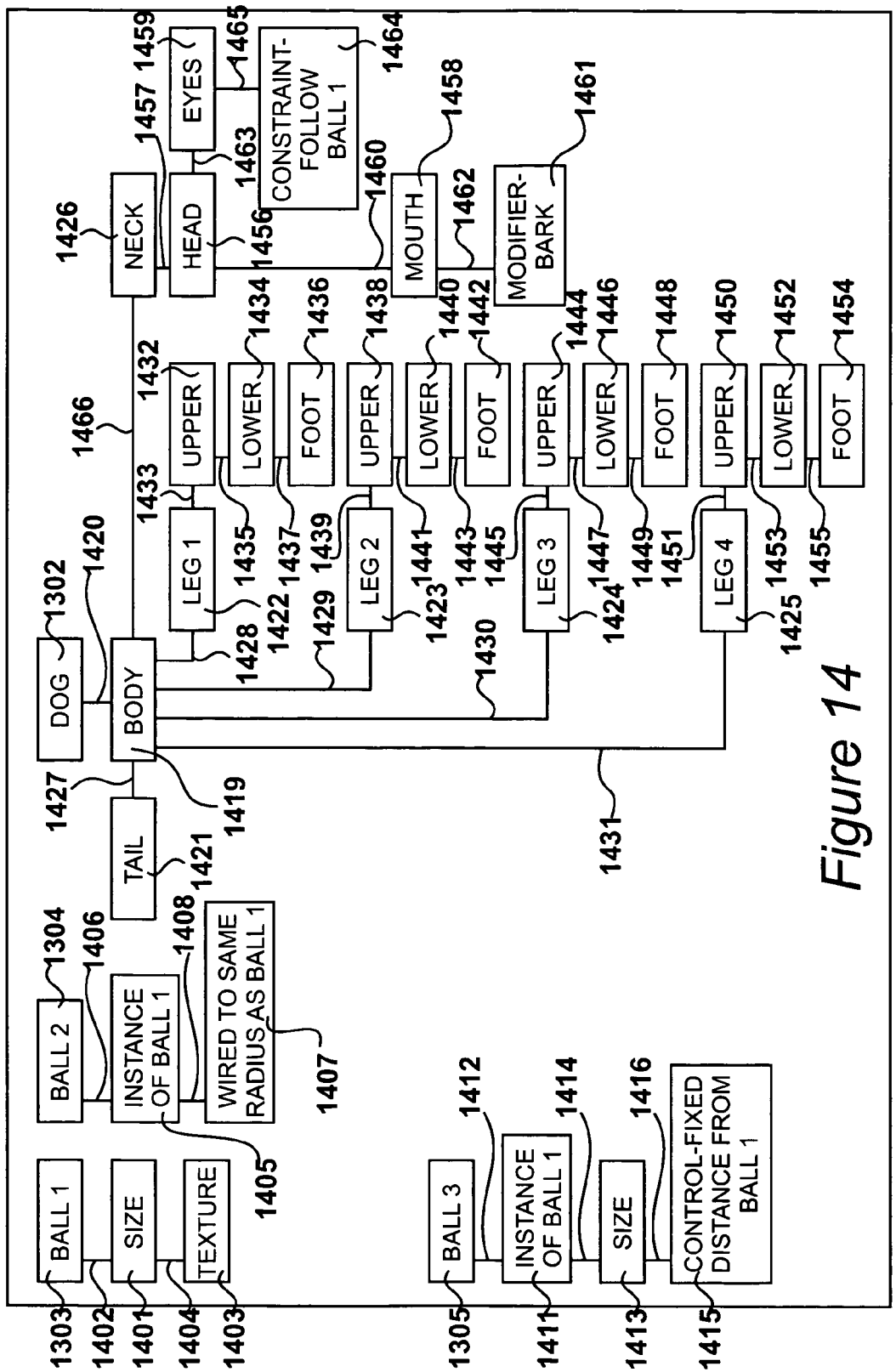
FIG. 14 shows an expanded version of the schematic view shown in FIG. 13, according to one embodiment of the present invention.

In response to operation of an appropriate menu function 1306, the schematic view 1301 is expanded to occupy the full screen of the visual display unit 104 and to display lower level related elements for each object as shown in FIG. 14, according to one embodiment of the present invention.

An expanded schematic view as effected by selection of menu function 1306 is shown in FIG. 8 in which nodes 1302, 1303, 1304 and 1305 are present. However, each of these objects has been constructed from a plurality of elements representing the topology of the object along with other attributes such as textures and inter-relationships. In the schematic view, as shown in FIG. 14, each of these elements is represented by a node and the relationships between the nodes (elements) are represented by links that, topologically speaking, may be considered as arcs.

Ball 1 object 1303 includes a node 1401 linked to the ball object 1303 via a link 1402. Node 1401 relates to the sizing of ball 1 such that the size of ball 1 may be controlled independently in response to additional data defined by a user. Ball 1 also has a texture applied thereto as identified by texture node 1403 connected to node 1401 via a link 1404.

Ball 2 object 1304 includes a node 1405 linked to the ball object 1304 via a link 1406. Node 1405 represents the fact that ball 2 is an instance of ball 1. Ball 2 is also wired to have the same radius as ball 1 as identified by node 1407 connected to node 1405 via a link 1408. A further node 1409 relates to the light inclusion of ball 2 and is connected to node 1407 by a link 1410.

Ball 3 object 1305 includes a node 1411 connected to the ball object via a link 1412. Node 1411 illustrates that ball 3 is an instance of ball 1. Ball 3 also has a node 1413 relating to its size which is connected to node 1411 via a link 1414. A further node, 1415, represents the fact that ball 3 is configured to remain a fixed distance from ball 1. Node 1415 is connected to node 1413 via a link 1416. There is also a node 1417 that relates to the light inclusion of ball 3 and is connected to node 1415 by a link 1418.

Dog object 1302 includes a node 1419 connected to the dog object via a link 1420. Node 1419 relates to the body of the dog. Nodes 1421, 1422, 1423, 1424, 1425 and 1426 are all connected to body node 1419. Node 1421 relates to the tail and is connected to body node 1419 via a link 1427.

Node 1422 relates to a first leg and is connected to body node 1419 via a link 1428. Node 1423 relates to a second leg and is connected to body node 1419 via a link 1429. Node 1424 relates to a third leg and is connected to body node 1419 via a link 1430. Node 1425 relates to a fourth leg and is connected to body node 1419 via a link 1431.

Leg 1 node 1422 includes a node 1432 connected to node 1422 via a link 1433. Node 1432 refers to the upper portion of the first leg. A node 1434 is connected to node 1432 via a link 1435 and relates to the lower portion of leg 1. Further, there is a foot node 1436 which is connected to node 1434 via a link 1437.

Leg 2 node 1423 includes a node 1438 connected to node 1423 via a link 1439. Node 1438 refers to the upper portion of the second leg. A further node 1440 is connected to node 1438 via a link 1441 and relates to the lower portion of leg 2. Further, there is a foot node 1442 which is connected to node 1440 via a link 1443.

Leg 3 node 1424 includes a node 1444 connected to node 1424 via a link 1445. Node 1444 refers to the upper portion of the third leg. A node 1446 is connected to node 1444 via a link 1447 and relates to the lower portion of leg 3. Further, there is a foot node 1448 which is connected to node 1446 via a link 1449.

Leg 4 node 1425 includes a node 1450 connected to node 1425 via a link 1451. Node 1450 refers to the upper portion of the fourth leg. A node 1452 is connected to node 1450 via a link 1453 and relates to the lower portion of leg 4. Further, there is a foot node 1454 which is connected to node 1452 via a link 1455.

Node 1426 relates to the neck and is connected to body node 1419 via a link 1466. Neck node 1426 includes a head node 1456 connected to neck node 1426 via a link 1457. Mouth node 1458 and eyes node 1459 are connected to head node 1456.

Mouth node 1458 is connected to head node 1456 via a link 1460. A further node 1461 represents the fact that a modifier is applied to the mouth which causes it to be animated when a barking sound is generated. Modifier node 1461 is connected to mouth node 1458 via a link 1462.

Eyes node 1459 is connected to head node 1456 via a link 1463. A further node 1464 is connected to eyes node 1459 via a link 1465 and represents a constraint upon eyes node 1459 that the eyes must follow the path of ball 1.

Figure 15:
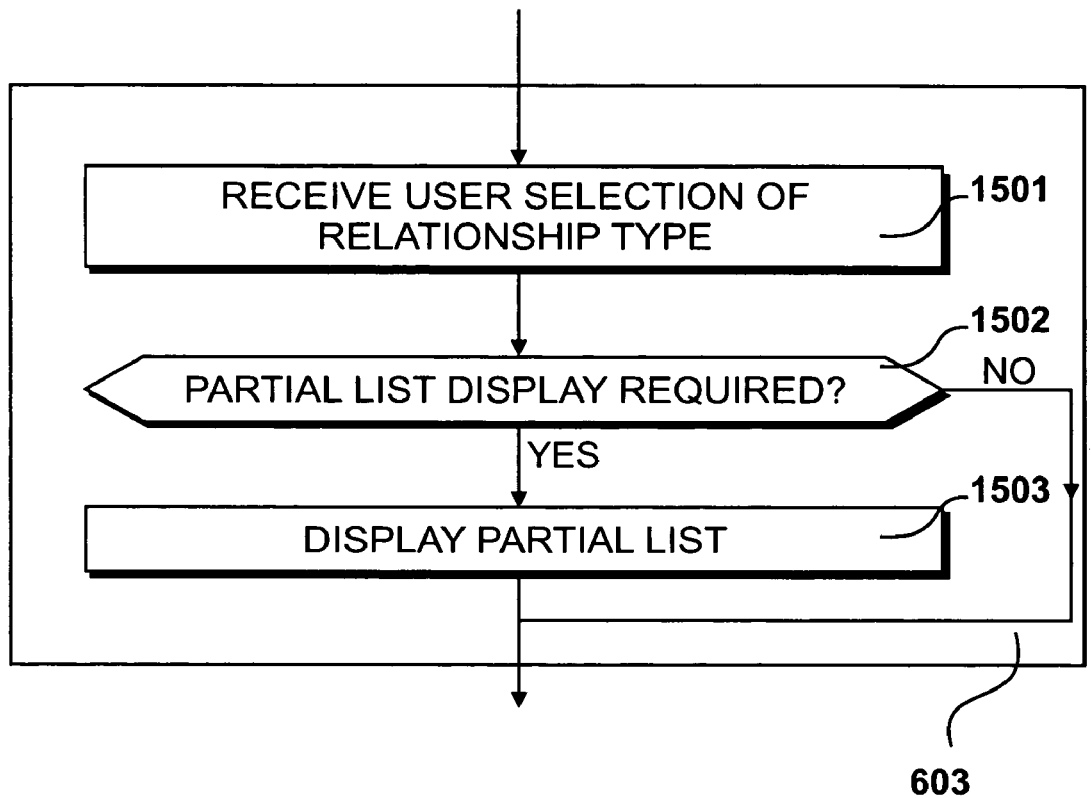
FIG. 15 shows an expansion of part of FIG. 6, according to one embodiment of the present invention.

FIG. 15 shows step 603 which relates to identifying a relationship selected by a user, according to one embodiment of the present invention. At step 1501, information is received relating to user selection of a relationship type. At step 1502, a question is asked as to whether or not a partial list should be displayed. If the question at step 1502 is answered in the affirmative, then a partial list is displayed at step 1503. If the question at step 1502 is answered in the negative then no further action is taken within step 603.

FIG. 16 shows a partial relationship types list as displayed at step 1503, according to one embodiment of the present invention. In FIG. 16 the relationship type "object instance" has been selected.

FIG. 17 shows a partial relationship types list as displayed at step 1503, according to one embodiment of the present invention. In FIG. 17 the relationship type "constraints" has been selected.

FIG. 18 shows a partial relationship types list as displayed at step 1503, according to one embodiment of the present invention. In FIG. 18 the relationship type "controller" has been selected.

FIG. 19 shows a partial relationship types list as displayed at step 1503, according to one embodiment of the present invention. In FIG. 19 the relationship type "modifier" has been selected.

FIG. 20 shows a partial relationship types list as displayed at step 1503, according to one embodiment of the present invention. In FIG. 20 the relationship type "parameter wiring" has been selected.

Figure 21:
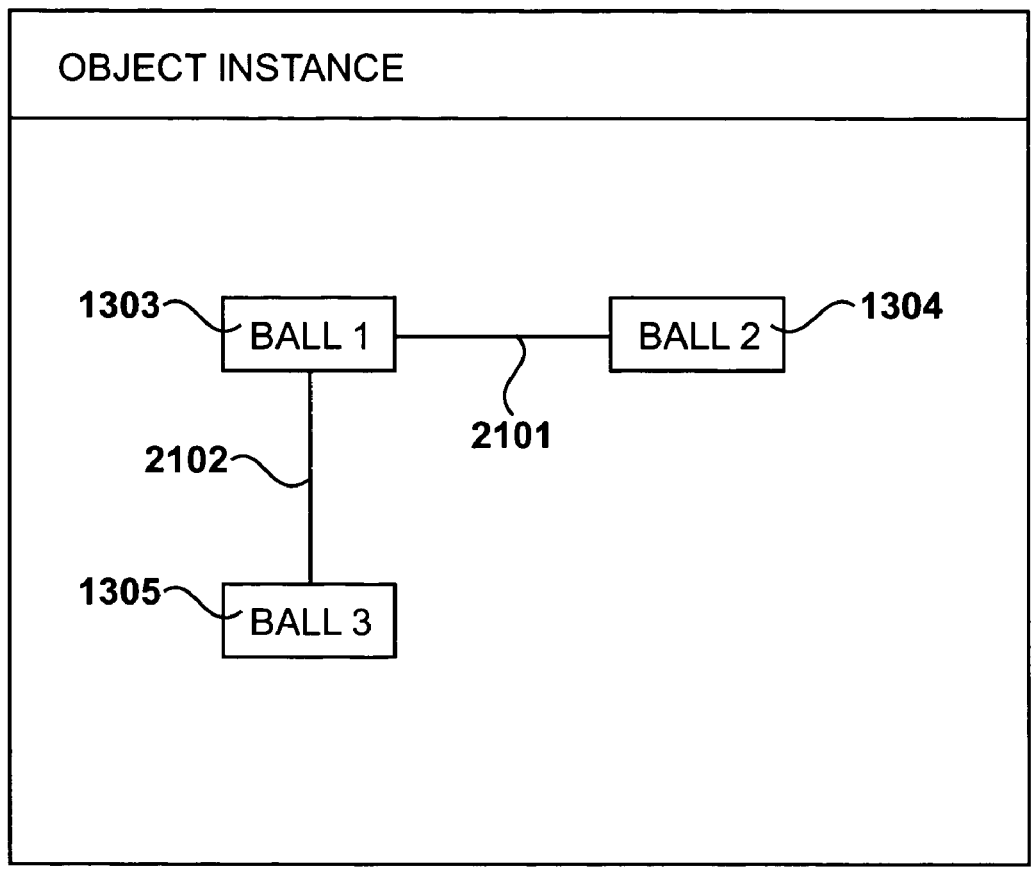
FIG. 21 shows a first modified schematic view, according to one embodiment of the present invention.

FIG. 21 shows an example of a modified schematic view, as displayed at step 604, according to one embodiment of the present invention. In FIG. 21 the relationship type "object instance" has been selected. The modified view consists of ball 1 node 1303, ball 2 node 1304 and ball 3 node 705. Ball 1 node 1303 is connected to ball 2 node 1304 via a link 2101, and ball 1 node 1303 is connected to ball 3 node 1305 via a link 2102. Links 2101 and 2102 represent the fact that ball 2 and ball 3 are both instances of the ball 1 object.

Figure 22:
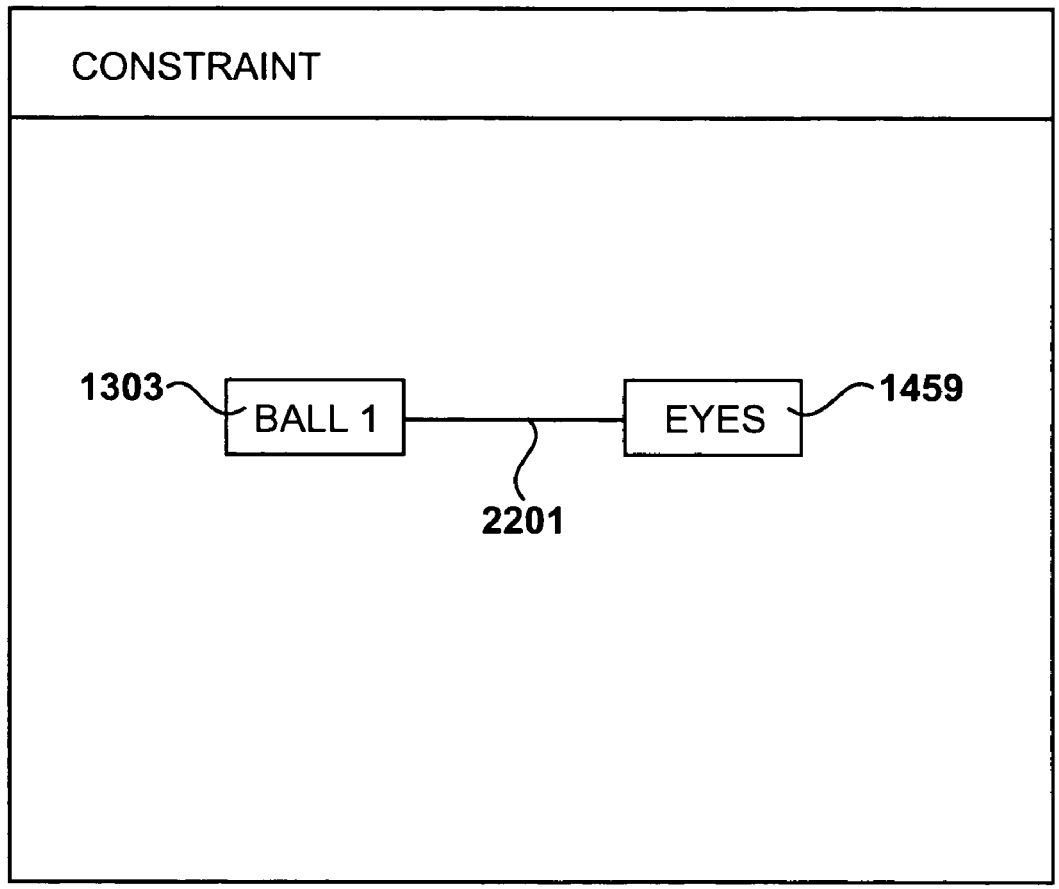
FIG. 22 shows a second modified schematic view, according to one embodiment of the present invention.

FIG. 22 shows an example of a modified schematic view, as displayed at step 604, according to one embodiment of the present invention. In FIG. 22 the relationship type "constraint" has been selected. The modified view consists of ball 1 node 1303 and eyes node 1459. Ball 1 node 1303 is connected to eyes node 1459 via a link 2201, Link 2201 represents the fact that the eyes are constrained to follow ball 1.

Figure 23:
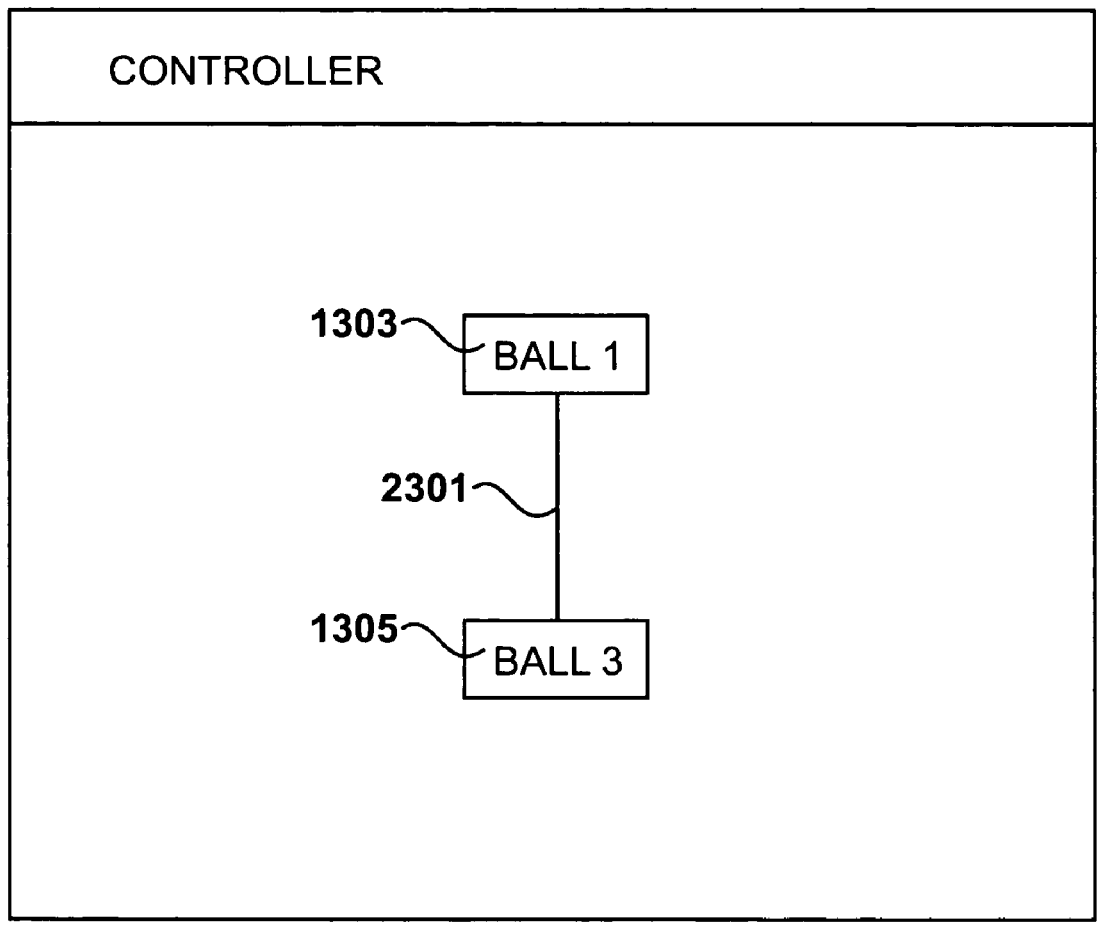
FIG. 23 shows a third modified schematic view, according to one embodiment of the present invention.

FIG. 23 shows an example of a modified schematic view, as displayed at step 604, according to one embodiment of the present invention. In FIG. 23 the relationship type "controller" has been selected. The modified view consists of ball 1 node 1303 and ball 3 node 1305. Ball 1 node 1303 is connected to ball 3 node 1305 via a link 2301, Link 2301 represents the fact that ball 3 is controlled by ball 1.

Figure 24:
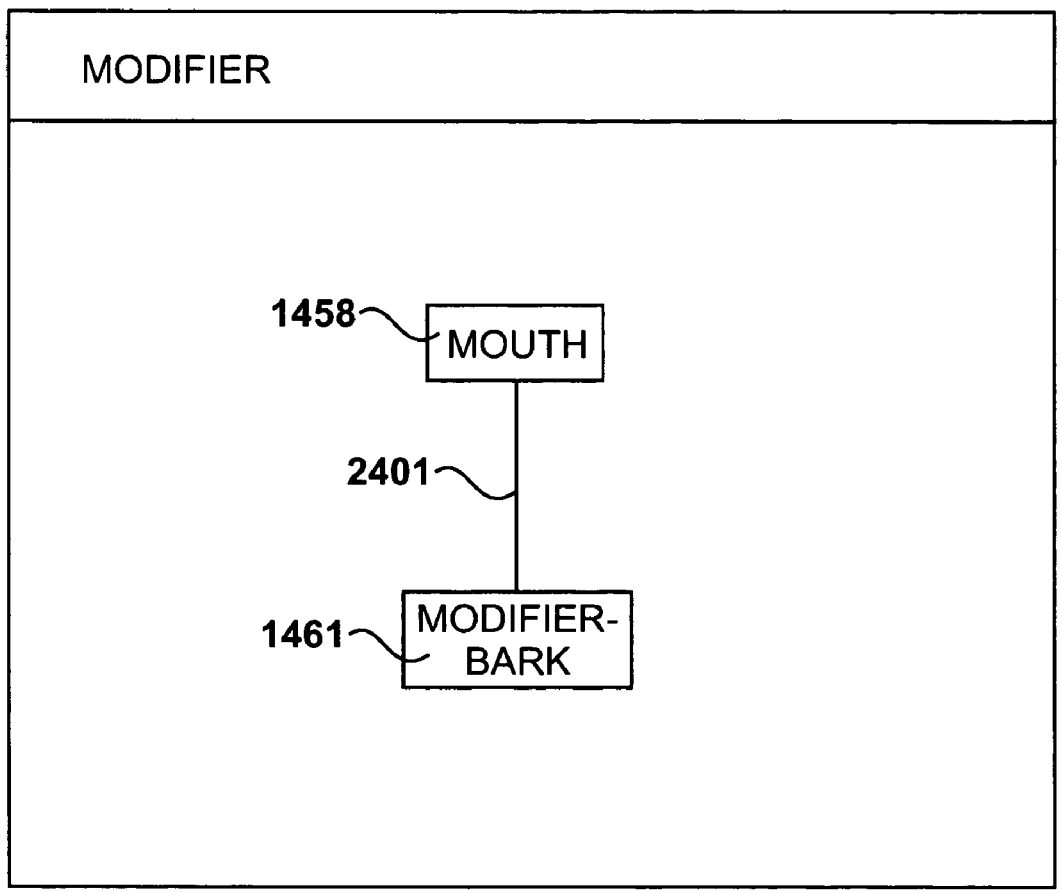
FIG. 24 shows a fourth modified schematic view, according to one embodiment of the present invention.

FIG. 24 shows an example of a modified schematic view, as displayed at step 604, according to one embodiment of the present invention. In FIG. 24 the relationship type "modifier" has been selected. The modified view consists of mouth node 1458 and modifier-bark node 1461. Mouth node 1458 is connected to modifier-bark node 1461 via a link 2401, Link 2401 represents the fact that the modifier acts upon the mouth.

Figure 25:
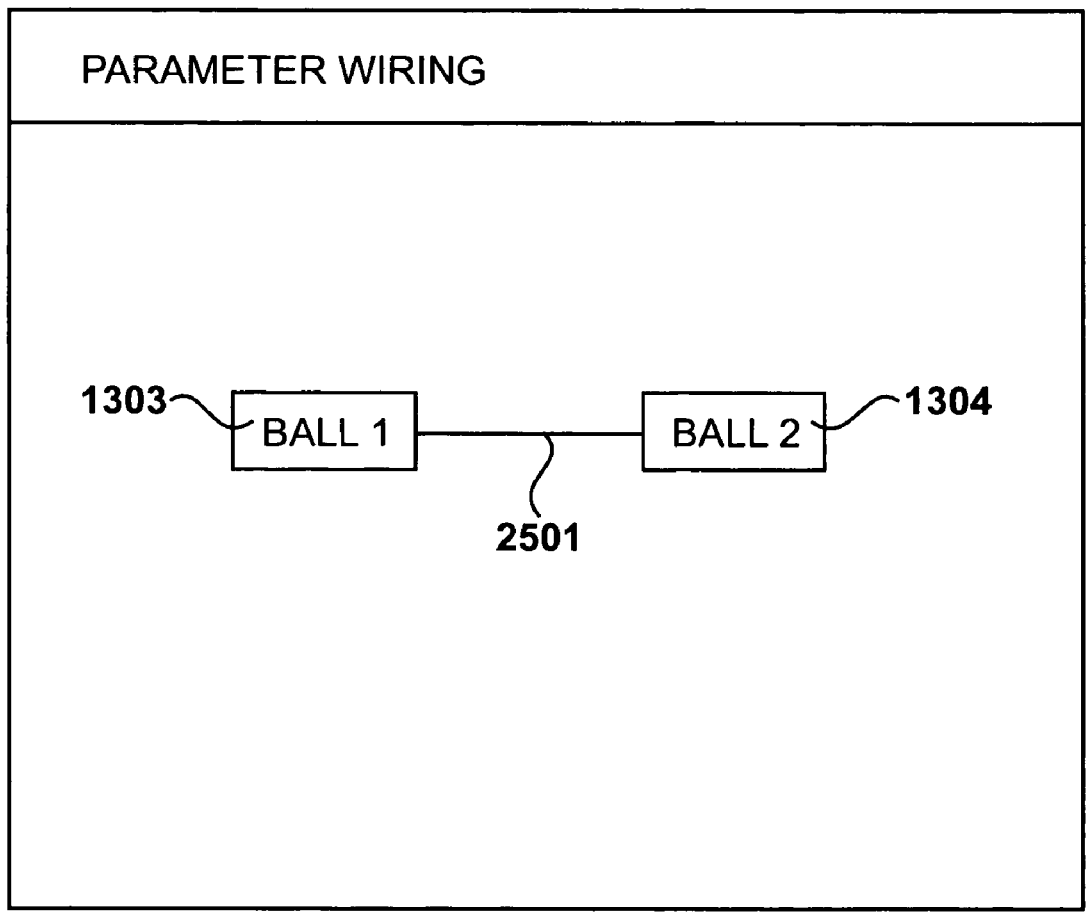
FIG. 25 shows a fifth modified schematic view, according to one embodiment of the present invention.

FIG. 25 shows an example of a modified schematic view, as displayed at step 604, according to one embodiment of the present invention. In FIG. 25 the relationship type "parameter wiring" has been selected. The modified view consists of ball 1 node 1303 and ball 2 node 1304. Ball 1 node 1301 is connected to ball 2 node 1304 via a link 2501, Link 2501 represents the fact that a parameter of ball 2 is configured to remain the same as that parameter of ball 1.

The invention has been described above with reference to specific embodiments. Persons skilled in the art will recognize, however, that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

The invention claimed is:

1. A computer-readable medium storing instructions for causing a computer to display a portion of a schematic representation of a graphics image that includes one or more objects, performing the steps of:

generating a list of relationships, each entry in the list of relationships identifying two nodes that each define an element, wherein each element represents at least part of a topology of at least one object within the graphics image, and a link between the two nodes defines a relationship type between the two elements, wherein the relationship type reflects how one of the two elements is animated in response to the other element being modified or manipulated;

receiving selection data specifying one relationship type of a plurality of relationship types in the generated list of relationships, wherein the plurality of relationship types includes a constraint relationship type, the constraint relationship type comprises a distance constraint, and the distance constraint limits the distance between a first object and a second object in the graphics image to a particular value; and displaying a portion of a schematic representation of the graphics image, wherein the portion of the schematic representation includes at least two nodes and a link between the at least two nodes, wherein the link is associated with a respective entry in the list of relationships, and the link corresponds to the one relationship type specified by the selection data.

2. The computer-readable medium of claim 1, further comprising the step of creating a displayable schematic representation of the graphics image including all of the elements and all of the links in the list of relationships.

3. The computer-readable medium of claim 2, further comprising the step of displaying the displayable schematic representation of the graphics image.

4. The computer-readable medium of claim 1, further comprising the step of displaying a modified list of relationships including entries in the list of relationships that are related by the one relationship type specified by the selection data.

5. The computer-readable medium of claim 1, further comprising the step of reordering the list of relationships to produce a reordered list of relationships.

6. The computer-readable medium of claim 5, further comprising the step of displaying the reordered list of relationships.

7. The computer-readable medium of claim 1, wherein the plurality of relationship types includes a modifier relationship type.

8. The computer-readable medium of claim 1, wherein the plurality of relationship types includes a controller relationship type.

9. The computer-readable medium of claim 1, wherein the plurality of relationship types includes an object instance relationship type.

10. The computer-readable medium of claim 1, wherein the plurality of relationship types includes a parameter wiring relationship type.

11. The computer readable medium of claim 1, wherein the graphics image comprises a three-dimensional graphics scene.

12. The computer-readable medium of claim 1, wherein a first node in the identified two nodes comprises a texture node that determines a texture applied to an element associated with a second node in the identified two nodes.

13. The computer-readable medium of claim 1, wherein the constraint relationship type comprises a size constraint, and the size constraint limits the size of a first object in the graphics image to be substantially equal to the size of a second object in the graphics image.

14. A computer-implemented method for displaying on a display device a portion of a schematic representation of a graphics image that includes one or more objects, the method comprising:
   generating a list of relationships, each entry in the list of relationships identifying two nodes that each define an element, wherein each element represents at least part of a topology of at least one object within the graphics image, and a link between the two nodes defines a relationship type between the two elements;
   receiving, from an input device, selection data specifying one relationship type of a plurality of relationship types in the generated list of relationships, wherein the relationship type reflects how one of the two elements is animated in response to the other element being modified or manipulated, wherein the plurality of relationship types includes a constraint relationship type, the constraint relationship type comprises a distance constraint, the distance constraint limits the distance between a first object and a second object in the graphics image to a particular value; and
   displaying, on the display device, the portion of the schematic representation of the graphics image, wherein the portion of the schematic representation includes including at least two nodes and a link between the at least two nodes, wherein the link is associated with a respective entry in the list of relationships, and the link corresponds to the one relationship type specified by the selection data.

15. The computer-implemented method of claim 14, further comprising the step of reordering the list of relationships to produce a reordered list of relationships.

16. The computer-implemented method of claim 14, further comprising the step of searching a database corresponding to the graphics image to identify links representing the one relationship type.

17. The computer-implemented method of claim 14, further comprising the step of displaying a modified list of relationships including entries in the list of relationships that are related by the one relationship type specified by the selection data.

18. The computer-implemented method of claim 14, further comprising the step of displaying a menu including the plurality of relationship types for selection of the one relationship type to produce the selection data input.

19. The computer-implemented method of claim 14, wherein the graphics image comprises a three-dimensional graphics scene.

20. The computer-implemented method of claim 14, wherein a first node in the identified two nodes comprises a texture node that determines a texture applied to an element associated with a second node in the identified two nodes.

21. The computer-implemented method of claim 14, wherein the relationship type comprises a size constraint, and the size constraint limits the size of a first object in the graphics image to be substantially equal to the size of a second object in the graphics image.

22. A system for displaying a portion of a schematic representation of a graphics image including nodes connected by links, each node representing an element and each link representing a relationship type, the system comprising:
   a memory configured to store instructions and data;
   a processor that, when executing the instructions, is configured to:
      generate a list of relationships, each entry in the list of relationships identifying two nodes that each define an element, wherein each element represents at least part of a topology of at least one object within the graphics image, and a link between the two nodes defines a relationship type between the two elements, wherein the relationship type reflects how one of the two elements is animated in response to the other element being modified or manipulated;
      receive selection data specifying one relationship type of a plurality of relationship types in the generated list of relationships, wherein the plurality of relationship types includes a constraint relationship type, the constraint relationship type comprises a distance constraint, and the distance constraint limits the distance between a first object and a second object in the graphics image to a particular value; and
      display the portion of the schematic representation of the graphics image, wherein the portion of the schematic representation includes at least two nodes and a link between the two nodes, wherein the link is associated with a respective entry in the list of relationships, and the link corresponds to the one relationship type specified by the selection data.

23. The system of claim 22, further comprising means for searching a database corresponding to the graphics image to identify links representing the one relationship type.

24. The system of claim 22, further comprising means for reordering the list of relationships to produce a reordered list of relationships.

25. The system of claim 24, further comprising:
   means for displaying the reordered list of relationships; and means for displaying the list of relationships.

26. The system of claim 22, wherein a first node in the identified two nodes comprises a texture node that determines a texture applied to an element associated with a second node in the identified two nodes.

27. The system of claim 22, wherein the relationship type comprises a size constraint, and the size constraint limits the size of a first object in the graphics image to be substantially equal to the size of a second object in the graphics image.

* * * * *